United States Patent
Rachwalski et al.

(10) Patent No.: US 8,179,891 B2
(45) Date of Patent: May 15, 2012

(54) METHOD AND APPARATUS FOR INTERDOMAIN MULTICAST ROUTING

(75) Inventors: Jon Rachwalski, Holbrook, NY (US); Daniel Witt, Center Moriches, NY (US)

(73) Assignee: VectorMAX Corporation, Farmingdale, NY (US)

( * ) Notice: Subject to any disclaimer, the term of this patent is extended or adjusted under 35 U.S.C. 154(b) by 240 days.

(21) Appl. No.: 11/626,889

(22) Filed: Jan. 25, 2007

(65) Prior Publication Data

US 2007/0171926 A1     Jul. 26, 2007

Related U.S. Application Data

(60) Provisional application No. 60/762,075, filed on Jan. 25, 2006.

(51) Int. Cl.
    *H04L 12/56* (2006.01)

(52) U.S. Cl. ........ 370/390; 370/230; 370/232; 370/235; 370/254; 370/256; 370/218; 370/312; 370/341; 370/342; 370/310; 370/392; 370/395.31; 370/401; 370/432; 709/203; 709/219; 709/213; 709/225; 709/227; 709/231; 709/236; 709/238

(58) Field of Classification Search ........................ None
See application file for complete search history.

(56) References Cited

U.S. PATENT DOCUMENTS

| | | | |
|---|---|---|---|
| 6,487,663 B1* | 11/2002 | Jaisimha et al. | 713/193 |
| 2002/0001310 A1* | 1/2002 | Mai et al. | 370/390 |
| 2002/0007374 A1* | 1/2002 | Marks et al. | 707/513 |
| 2002/0198953 A1* | 12/2002 | O'Rourke et al. | 709/213 |
| 2003/0188106 A1* | 10/2003 | Cohen | 711/133 |
| 2003/0191901 A1* | 10/2003 | Hill et al. | 711/137 |
| 2004/0264440 A1* | 12/2004 | Wan et al. | 370/352 |
| 2005/0021833 A1* | 1/2005 | Hundscheid et al. | 709/236 |
| 2006/0039388 A1* | 2/2006 | Shur et al. | 370/401 |
| 2006/0195602 A1* | 8/2006 | Shibata et al. | 709/231 |
| 2006/0221962 A1* | 10/2006 | Previdi et al. | 370/390 |
| 2007/0002858 A1* | 1/2007 | Bichot et al. | 370/390 |

FOREIGN PATENT DOCUMENTS

WO    WO 2007087590 A1 *   8/2007

OTHER PUBLICATIONS

IGMP Proxy Behavior draft-ietf-behave-multicast-00 Behave D. Wing Internet-Draft Cisco Systems Expires: Nov. 14, 2005 May 13, 2005.*

* cited by examiner

*Primary Examiner* — Robert Scheibel
*Assistant Examiner* — Ajay Cattungal
(74) *Attorney, Agent, or Firm* — Jack Schwartz and Associates PLLC

(57) ABSTRACT

An apparatus bridges a plurality of domains and routes multicast datastreams between them. The apparatus includes a receiver which receives a client request signal via a multicast access protocol from a user connected within a first domain. A transmitter requests multicast content using a multicast transmission protocol from a provider within a second domain. A processor processes the multicast content received from the provider. The transmitter relays the multicast content from the second domain to the first domain for access by the user.

9 Claims, 2 Drawing Sheets

METHOD AND APPARATUS FOR INTERDOMAIN MULTICAST ROUTING

FIELD OF THE INVENTION

The present invention relates to a method and apparatus for routing multicast packets in a packet-switching network between different network domains.

BACKGROUND OF THE INVENTION

Typically, routing of multicast IP traffic between domains occurs in two scenarios. A first scenario occurs when two wide area networks (e.g. ISPs) are connected to form a peer network. In this scenario, a gateway protocol (e.g. Multiprotocol Border Gateway Protocol) is used to negotiate dynamic routes (e.g. via PIM-SM) between the two autonomous networks. These networks are peers and imply a significant amount of trust between operators. Additionally, these networks require substantial information technology (IT) resources to successfully manage.

A second, and more common arrangement occurs when two networks having different domains are related in a Provider—User network domain relationship. An example is an Internet Service Provider (ISP)—Internet Service User (ISU) relationship. In this case, for multicasting to occur, this second arrangement simulates the behavior of a special host. For example, the user domain includes IP multicast clients which are adjacent to the provider's multicast router or are separated by multicast routers capable of proxying link-local multicast requests and thus are able to successfully request forwarding of desired multicast traffic. This second scenario could be considered a special case of inter-domain multicast dynamic routing.

This second scenario is frequently desirable because administration of each respective domain is self-contained and each domain expends resources to manage their own respective domain and users connected thereto. However, to implement dynamic multicast routing between domains is more complex, requiring significantly more effort. Additionally, dynamic multicast routing between domains requires two networked domains to be interconnected and exchanging information at a relatively high level. This results in substantial information technology security risks that administrators of both provider and user networks may be unwilling to manage.

At present, there is a lack of devices and/or protocols able to perform dynamic multicast routing, even via proxy. Further complicating matters, typical networks contain additional elements that can interfere with multicast routing such as firewalls which are common and frequently unable to handle dynamic routing protocols. Although some devices support proprietary functionality that overcomes some of these limitations, they tend to be ineffective in the common case of networks that are currently in existence using devices from multiple vendors.

Therefore, a need exists for a method and apparatus that enables multicast routing between domains where a peer relationship can be avoided and requires only limited IP multicast routing support on a user's network.

A system according to invention principles addresses these deficiencies and associated problems.

SUMMARY OF THE INVENTION

In accordance with principles of the present invention, an apparatus bridges a plurality of domains and routes a multicast content datastream among them. The apparatus includes a receiver which receives a client request signal via a multicast access protocol from a user connected within a first domain. A transmitter requests multicast content using a multicast transmission protocol from a provider within a second domain. A processor processes the multicast content received from the provider. The transmitter transmits the multicast content to the first domain for access by the user.

Such an apparatus allows multicast routing between networks interconnected in a service provider-service user relationship. Processing of requests for content, acquisition of content and distribution of received content occurs at the border of the user network. By nature of its' position on the edge of the provider's network, the apparatus can request multicast traffic from a multicast provider via the traditional host mechanism using a multicast protocol. The apparatus is able to receive the requested content and replicate and relay the received multicast content to users on the user network. The relayed traffic can be routed through the user's network over most current generation equipment, while benefiting from the improved multicast routing capability. In this manner, no coordinated routing occurs between a first domain (user network) and a second domain (provider network). The method is invoked by traditional unicast messaging between hosts on the user's network and the apparatus. Prior to receipt of multicast traffic, a request is made directly to the apparatus, in addition to the request sent to the adjacent multicast router.

BRIEF DESCRIPTION OF THE DRAWING FIGURES

DETAILED DESCRIPTION OF THE INVENTION

A processor, as used herein, operates under the control of an executable application to (a) receive information from an input information device, (b) process the information by manipulating, analyzing, modifying, converting and/or transmitting the information, and/or (c) route the information to an output information device. A processor may use, or comprise the capabilities of, a controller or microprocessor, for example. A processor comprises any combination of, hardware, firmware, and/or software.

An executable application, as used herein, comprises code or machine readable instructions for conditioning the processor to implement predetermined functions, such as those of an operating system, interdomain multicast routing system or other information processing system, for example, in response to user command or input. An executable procedure is a segment of code or machine readable instruction, subroutine, or other distinct section of code or portion of an executable application for performing one or more particular processes. These processes may include receiving input data and/or parameters, performing operations on received input data and/or performing functions in response to received input parameters, and providing resulting output data and/or parameters. All functions of the apparatus and systems illustrated in FIG. 1, FIG. 2 and FIG. 3 can be implemented using software, hardware or a combination thereof.

A multicast data stream as used herein comprises a continuous stream of data originating from a single source that is transmitted and broadcast to members of a specified group of users or to a specified system. An example of such a multicast data stream is a multimedia content data stream. Multimedia content or a multimedia data content stream as used herein is any encoded or un-encoded data having at least one of video data and audio data.

A domain as used herein refers to a network of computers that are interconnected and managed by a single administrative entity. The domain may include a plurality of sub-networks interconnected to one another to form the domain network. A service provider network is a network that provides users connected thereto access to an internet protocol (IP) based network such as the Internet, e.g. an Internet Service Provider (ISP). An enterprise network is a network of users that is self-administered and that connects to a service provider network to gain access to an IP based network in order to communicate with other enterprise networks and users thereof.

Figure 1:
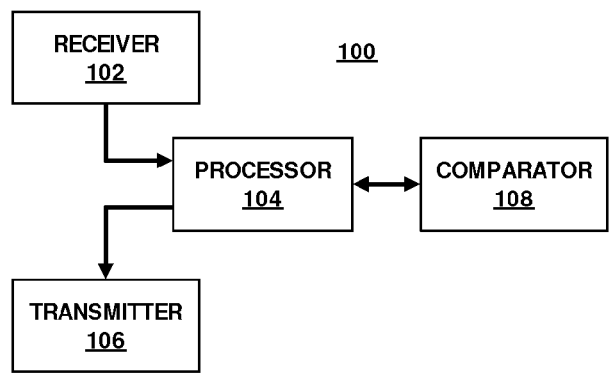
FIG. 1 is a block diagram of apparatus according to principles of the present invention.

FIG. 1 is a block diagram of multicast proxy apparatus 100 according to principles of the present invention. In FIG. 1, an output terminal of a receiver 102 is coupled to a corresponding input terminal of a processor 104, An output terminal of the processor 104 is coupled to a corresponding input terminal of a transmitter 106. A bidirectional terminal of the processor 104 is coupled to a corresponding terminal of a comparator 108.

In operation, the apparatus 100 of FIG. 1 operates to bridge a plurality of domains and to receive a multicast content datastream. The receiver 102 receives a client request signal via a multicast access protocol from a user connected within a first domain. The transmitter 106 requests multicast content using a multicast transmission protocol from a provider within a second domain. The processor 104 processes the multicast content received from the provider. The transmitter 106 transmits the multicast content to the first domain for access by the user.

In one embodiment, the apparatus 100 is contained within the first domain. The receiver 102 is able to receive a plurality of client request signals from a plurality of users within the first domain. The transmitter 106 transmits the multicast content directly to the user. In such an arrangement, the transmitter transmits the received multicast content to a storage device within said first domain which is accessible by users in the first domain. The comparator 108 compares the requested content of the plurality of received request signals, and the processor 104 determines if the plurality of request signals are requesting the same content. Upon a determination that at least one subsequent client request signal is for content associated with an initial client request signal, the processor 104 provides an address of the stored multicast content to the subsequent requesting users for accessing the stored content. The stored content is transmitted to the plurality of users via a multicast transmission protocol. For example, the users are able to access the stored content within the domain using an Internet Group Management Protocol (IGMP) request. Use of a multicast access protocol, e.g. IGMP, allows a multicast request to traverse a unicast communication network.

Figure 2:
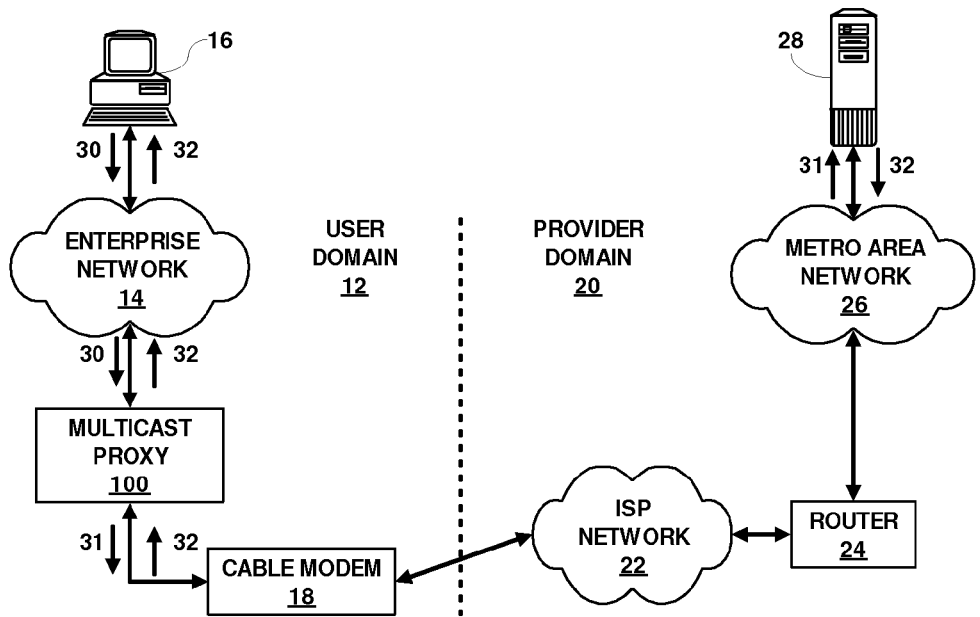
FIG. 2 is a block diagram of an inter-domain networked system including the apparatus according to principles of the present invention as illustrated in FIG. 1.

As described above, the multicast proxy apparatus 100 illustrated in FIG. 1 allows users of a first networked domain to request content available via multicast from a multicast streaming server connected to a second different networked domain. FIG. 2 illustrates such an environment. In FIG. 2, a first domain 12 is the user domain. Domain 12 contains users wishing to receive a multicast data stream. Domain 12 includes an enterprise network 14 and at least one user 16 connected to the enterprise network 14. The enterprise network 14 may, for example, be a corporate intranet that is controlled and administered by an internal IT department and/or administrator. The first domain 12 further includes the IP multicast proxy apparatus 100, as illustrated in FIG. 1. The multicast proxy apparatus 100 is connected to a cable modem or other routing device 18 that provides the at least one user 16 of the enterprise network access to an IP based network such as the Internet.

A second networked domain 20 is shown herein as a provider domain and is administered to provide a plurality of services to a plurality clients or client networks that are connected thereto. The second domain 20 includes an internet service provider (ISP) network 22 and at least one routing device 24 for connecting a plurality of clients and servers to the ISP network 22. A further network, shown herein as a metro area network 26, is included within the provider domain 20 and is administered by an entity associated with the provider domain 20. A content provider 28 is connected to the further network 26 and is shown herein as a video streaming server that is able to stream multicast content via the further network 26 for use by clients connected to, but not administered by, the provider network 20 (e.g. user 16 in the user domain 12). For purposes of example, the content provided by the streaming server 28 is multimedia streaming audio-video content. However, the content providing streaming server 28 may provide data content in any form for receipt by a requesting user.

The multicast proxy apparatus 100 allows user 16 in the user domain 12 to request and receive multicast content. The multicast proxy apparatus 100 is positioned at the fringe of the user domain (e.g. cable modem 18) and acts as a gateway for controlling multicast content.

The user 16 selectively requests multicast content that is made available by the content provider 28 via an IP based network. The request is shown herein as an arrow labeled with the reference numeral 30. The request 30 is transmitted via the enterprise network 14 and received by the receiver 102 (FIG. 1) in the multicast proxy apparatus 100. The request 30 made by the user 16 is made using a unicast request which is conventionally known and typically associated with clients requesting information within a domain such as the user domain 12. The request 30 is made using a multicast access protocol that allows for unicast communication between the user 16 and the multicast proxy apparatus 100. The multicast access protocol used by the requesting client 16 operates similarly to IGMP with an important difference. Instead of link-local access of adjacent routers to route the request, as used in traditional multicast requests, the multicast access protocol used by the user 16 in FIG. 2 is able to traverse a unicast network using a unicast transmission protocol to communicate with the multicast proxy apparatus 100.

The multicast proxy apparatus 100 analyzes the request 30 and, upon determining that the content requested is available by multicast, issues a multicast request 31 using a multicast protocol such as Internet Group Management Protocol (IGMP), shown herein by the arrow labeled with reference numeral 31. The multicast request 31 is transmitted via the modem 18 to the second (provider) domain 20. The multicast request 31 is transmitted through the ISP network 22, the router 24 and the further metro area network 26 in a known manner. The multicast request 31 is received by the content providing streaming server 28 which provides the requested content in response to the received multicast request 31. The content is represented by the arrows labeled with reference numeral 32. The content 32 is transmitted via the further metro area network 26, the router 24 and the ISP network 22 of the provider domain 20 in a known manner. The content 32 is received by the modem 18 at the fringe of the user domain 12. The modem provides the received content to the multicast proxy apparatus 100. The multicast proxy apparatus 100 invokes multicast forwarding through the enterprise network 14 for receipt by the client 16 who made the original request 30 for the content 32.

This manner of requesting and receiving multicast content is advantageous for the owners and operators of the user domain 12 and the provider domain 20. With respect to provider domains (e.g. 20), which are typically responsible for providing a plurality of services associated with an IP based network to a plurality of users, the multicast proxy apparatus 100 enables simplified network management with respect to multicast content disturbed over the provider domain 20 networks (22, 26). In addition, use of the multicast proxy apparatus 100 of FIG. 1 obviates the co-mingling and interconnection of a plurality of different client domain networks with one another and with the provider domain network infrastructure that heretofore is required for proper multicasting to occur. Such interconnections increase security risks, thus use of the multicast proxy apparatus 100 decreases such security risks.

With respect to user network domains (e.g. 12), us of the multicast proxy apparatus 100 also provides security advantages. For example, user domains 12 can request and receive multicast content without directly syncing routing tables and/or other parameters with the routing tables and/or other parameters of the provider networks. In this manner, user domains 12 which include enterprise networks 14, such as large corporations, who typically control access to all of the services associated with IP based networks with the exception of providing the actual access to the network itself, may provide multicast access without changing data stored in internal routers.

Figure 3:
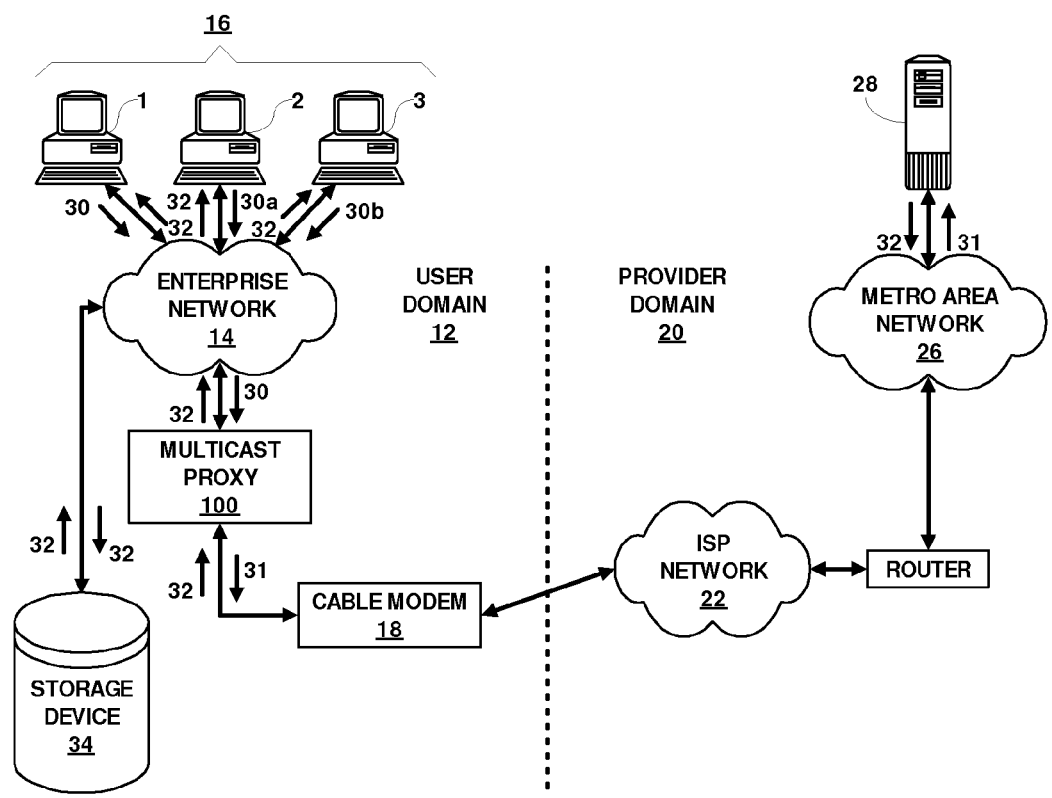
FIG. 3 is a block diagram of an inter-domain networked system including the apparatus according to principles of the present invention as illustrated in FIG. 1.

FIG. 3 illustrates a similar environment as that illustrated in FIG. 2, but illustrates an additional feature provided by the multicast proxy apparatus 100. Elements in FIG. 3 which are similar to those illustrated in FIG. 2 are designated by the same reference number, operate in the manner as described above with respect to FIG. 2, and are not described in detail below. FIG. 3 illustrates a plurality of users 16, including a first user 1, a second user 2 and a third user 3, coupled to the enterprise network 14. The users 16 are able to concurrently send respective requests 30 for the multicast content from the content source 28. The multicast proxy apparatus 100 receives and processes the respective requests 30 in order to maintain network efficiency in the user domain 12. The multicast proxy apparatus 100 transmits a multicast content request 31 that is transmitted to and through the provider domain 20 for receipt by the content provider 28. In response, a multicast content stream 32 is provided by the content provider 28 for receipt by the multicast proxy apparatus 100 in the user domain 12.

In the case where a plurality 16 of users concurrently request the same content stream, the multicast proxy apparatus 100 replicates and/or repeats the received content stream for the additional requesting users (e.g. 1, 2 or 3). More specifically, in the illustrated embodiment, the user domain 12 further includes a storage device 34 coupled to the enterprise network 14. The storage device 34 may be any computer or server able to store multimedia data and provide access to the multimedia data via a multicast protocol to users 16 coupled to the enterprise network 14. The multicast proxy apparatus 100 may provide the multicast content stream 32 directly to a first user (1, 2 or 3) as described above, may provide the multicast content stream 32, to the storage device 34, or both.

For example, a first user 1 may issue an initial content request 30 which is received by the multicast proxy apparatus 100. The initial request 30 is forwarded to the provider domain 20 to obtain the multicast content stream 32, as described above. For example, the multicast proxy apparatus 100 may utilize IGMP to initiate receipt of the multicast content stream 32 from the content provider 28 located on the provider domain 20. When the multicast content stream 32 is received by the multicast proxy apparatus 100 within the user domain 12, the multicast content stream 32 may be stored at a location in the storage device 34. The plurality 16 of users are able to make IGMP requests to adjacent routers (not shown) within the enterprise network 14 which are configured to dynamically route requested multicast content stream 32 from the storage device 34 to the requesting user, i.e. the first user 1. It is also possible for the multicast content stream 32 to also be routed from the multicast proxy apparatus 100 to the first user 1 provided no other users 16 have requested this multicast content stream 32.

A second user 2 issuing a request 30 for the same content initiates a second content request 30a using a multicast access protocol. The multicast proxy apparatus 100 receives and processes the request 30a. The multicast proxy apparatus 100 determines that the multicast content stream 32 being requested by the second content request 30a is equivalent to the multicast content stream 32 previously requested by the initial content request 30. The multicast proxy apparatus 100 continues to receive the multicast content stream 32 and to store it in the previously determined location in the storage device 34. The multicast proxy apparatus 100 also provides an address to the second user 2 identifying where the requested multimedia content stream 32 can be found. In accordance with the example shown herein, the address is the address of the storage device 34. The second user 2 accesses the address provided by the multicast proxy apparatus 100, that is the storage device 34, using IGMP. In response, the storage device 34 supplies the multimedia content stream 32 to an adjacent router (not shown) which establishes a dynamic multicast route from the storage device 34 to the second user 2.

Similarly, a third user 3 requesting the same content that was requested by and is being served to the first and second users (1 and 2, respectively), initiates a third request 30b for the content. The third request 30b is handled similarly to the second request 30a as described hereinabove. The third user 3 is provided with the address on the storage device 34 where the content 32 is stored. The third user 3 accesses the address provided and is able to initiate multicast of the desired content from the storage device 34 to the third user 3. The multicast is performed by traditional multicast routing whereby the third user 3 initiates a request using IGMP to an adjacent router (not shown) which establishes a dynamic multicast route to the storage device 34.

The multicast proxy apparatus 100 allows multicasting to occur within a domain (e.g. 12). This reduces the difficulty associated with synchronizing two different domain networks (12, 20) together in order to allow for content to be multicast from a multicast provider 28 across two different domain networks (12, 20) for receipt by a requesting user (1, 2, 3) of one of the domains (12). This preserves security within the user domain 12 while allowing content originating outside of the user domain 12 to be accessed by users 16 (clients) of the user domain 12.

What is claimed is:

1. An apparatus for bridging a plurality of domains and for routing a multicast content datastream among them comprising:
   a receiver receiving a unicast request signal formatted for requesting multicast distributed content and transmitted using a multicast access protocol, said unicast request signal is received from a user connected within a first domain administered by a first administrative entity according to a first set of administrative routing parameters, said first domain including a unicast communication network for transmitting said unicast request signal, said multicast access protocol enables the unicast request signal to traverse said unicast communication network, the unicast communications network using a unicast transmission protocol;
   a transmitter requests the multicast distributed content using a multicast transmission protocol from a provider within a second domain in response to receiving said unicast request signal, said second domain being administered by a second different administrative entity according to a second different set of administrative routing parameters; and
   a processor processes the multicast distributed content received from the provider and conditions the transmitter to transmit the multicast distributed content via multicast forwarding over a multicast communication network within the first domain for access by the user.

2. The apparatus of claim 1, wherein the transmitter transmits the multicast content directly to the user.

3. The apparatus of claim 1, wherein the apparatus is contained within the first domain.

4. The apparatus of claim 1, wherein the receiver is able to receive a plurality of client request signals from a plurality of users.

5. The apparatus of claim 4, wherein the transmitter transmits said received multicast content to a storage device within said first domain and accessible by client users thereof.

6. The apparatus of claim 5, further comprising: a comparator for comparing the plurality of received request signals, and said processor determines if the plurality request signals are requesting the same content.

7. The apparatus of claim 6, wherein upon determination that at least one subsequent client request signal is for content associated with an initial client request signal, said processor provides an address of said stored multicast content to said subsequent requesting users for accessing said stored content.

8. The apparatus of claim 7, wherein said stored content is transmitted to said plurality of users via a multicast transmission protocol.

9. An apparatus for bridging a plurality of domains and for routing a multicast content datastream among them comprising:
   a receiver receiving a unicast request signal formatted for requesting multicast distributed content and transmitted using a multicast access protocol, said unicast request signal is received from a user connected within a first domain administered by a first administrative entity according to a first set of administrative routing parameters, said first domain including a communication network conditioned to transmit unicast formatted data and multicast formatted data, said multicast access protocol enables said unicast request to traverse said communication network using a unicast transmission protocol;
   a transmitter requests the multicast distributed content using a multicast transmission protocol from a provider within a second domain in response to receiving said unicast request signal, said second domain being administered by a second different administrative entity according to a second different set of administrative routing parameters; and
   a processor processes the multicast distributed content received from the provider and conditions the transmitter to transmit the multicast distributed content via multicast forwarding over a multicast communication network within the first domain for access by the user.

* * * * *